United States Patent [19]

Gold

[11] Patent Number: 4,986,595

[45] Date of Patent: Jan. 22, 1991

[54] MECHANICAL INTERLOCK OF CURABLE SEALANT FOR MODULAR FRAMED AUTO GLASS PARTS

[76] Inventor: Peter N. Gold, 465 N. Wood Rd., Rockville Centre, N.Y. 11570

[21] Appl. No.: 468,753

[22] Filed: Jan. 24, 1990

[51] Int. Cl.[5] .............................................. B60J 1/02
[52] U.S. Cl. ..................................... 296/201; 296/93; 52/208
[58] Field of Search ...................... 296/201, 93, 96.27; 52/208

[56] References Cited

U.S. PATENT DOCUMENTS

| | | | |
|---|---|---|---|
| 2,547,799 | 4/1951 | Wernig | 296/96.21 |
| 4,072,340 | 2/1978 | Morgan | 296/201 |
| 4,405,175 | 9/1983 | Hoffmann | 296/201 |
| 4,700,525 | 10/1987 | Nieboer et al. | 52/208 X |
| 4,905,432 | 3/1990 | Romie | 296/201 X |

FOREIGN PATENT DOCUMENTS 2520428 7/1983 France ............................... 52/208

Primary Examiner—Dennis H. Pedder
Assistant Examiner—Andrew C. Pike
Attorney, Agent, or Firm—Collard, Roe & Galgano

[57] ABSTRACT

The present invention provides a retention system for use with a curable adhesive for retaining a glass window pane supported on a flange of an automotive vehicle body. The system has a glass window pane secured to the inner surface of a moulding. A flange is spaced a first distance from the outer surface of the moulding, and this flange is spaced a second distance from the rear surface of the moulding. The rear surface of the molding contains a trapezoidal or conical shaped recess. A curable adhesive is received within the first spaced distance, the second spaced distance and the trapezoidal or conical shaped recess to form a mechanical interlock within this recess.

5 Claims, 1 Drawing Sheet

MECHANICAL INTERLOCK OF CURABLE SEALANT FOR MODULAR FRAMED AUTO GLASS PARTS

BACKGROUND OF THE INVENTION

1. Field of the Invention

The present invention relates to a retention system using a curable adhesive for retaining a glass window pane supported on a flange of an automotive vehicle body. The retention system has a glass window pane secured to the inner surface of a moulding. A flange is spaced a first distance from the outer surface of the moulding, and this flange is spaced a second distance from the rear surface of the moulding. The rear surface of the moulding contains a shaped recess. A curable adhesive is received within the first spaced distance, the second spaced distance and the shaped recess to form a mechanical interlock within this recess.

2. The Prior Art

It is common to utilize curable sealants such as urethane sealants to mechanically retain stationary windows on motor vehicles. Normally, this retention scheme also includes a decorative trim which conceals the cavity between the glass and the other painted metal panel or flange of the motor vehicle body. This trim is also retained by the urethane sealant. It has been found, however, that the bond between the urethane sealant and the painted metal flange on the vehicle body is either not initially formed properly or deteriorates through time such that the windshield loosens and allows leaks to develop. For example, the retaining function of the sealant can be reduced between the sealant and the body panel by oxidation of paint and/or metal, acid rain, ultraviolet light, torsional and bending movement, vibration, etc,. and/or a combination of these factors.

There has been a long felt need to provide a system which enhances the bond between the urethane sealant and the flange of the motor vehicle which, while still utilizing the curable urethane sealant, provides an additional mechanical interlock between the sealant and the vehicle body such that a failure in the bond does not result in a loss of mechanical retention. In addition, since the above-described prior art retention method is utilized on hundreds of thousands of motor vehicles each year, it is absolutely necessary that the proposed method of enhancing the mechanical interlock be easily adapted to mass production and require little additional labor to implement.

SUMMARY OF THE INVENTION

It is an object of the invention to provide a system for enhancing the mechanical retention of a window on a flanged body panel of an automotive vehicle body utilizing a curable urethane sealant.

It is yet an additional object of this invention to provide a system which utilizes the urethane sealant to form a mechanical interlock to the moulding of the body panel whereby mechanical retention is not lost should the bond between the urethane sealant and the moulding lose its retention strength.

The above objects are accomplished in accordance with the present invention by providing a retention system for use with a curable adhesive for retaining a glass window pane supported on a flange of an automotive vehicle body. The retention system comprises a moulding having an inner surface, an outer surface, and a rear surface connecting the inner surface to the outer surface; a glass window pane secured along a periphery thereof to the inner surface of the moulding; a flange separated a first spaced distance from the outer surface of the moulding and separated a second spaced distance from the rear surface of the moulding. There is a means defining a shaped recess with the rear surface of the moulding, the shaped recess having a opening adjacent to the flange, the recess having an end wall located at a further distance from the flange than the opening is located, and the recess having a sidewall connecting the opening to the end wall to define an interior portion. The cross-section of the opening of the recess is smaller than the cross-section of the interior portion. A curable adhesive is received within the first spaced distance between the outer surface of the molding and the flange, and is received within the second spaced distance between the rear surface of the molding and the flange, and is also received within the shaped recess; whereby a mechanical interlock is formed between the curable adhesive, upon the curing thereof, and the shaped recess.

BRIEF DESCRIPTION OF THE DRAWINGS

Other objects and features of the present invention will become apparent from the following detailed description considered in connection with the accompanying drawing which discloses one embodiment of the present invention. It should be understood, however, that the drawing is designed for the purpose of illustration only and not as a definition of the limits of the invention.

In the drawing wherein similar reference characters denote similar elements throughout the several views.

DETAILED DESCRIPTION OF THE PREFERRED EMBODIMENT

Figure 1:
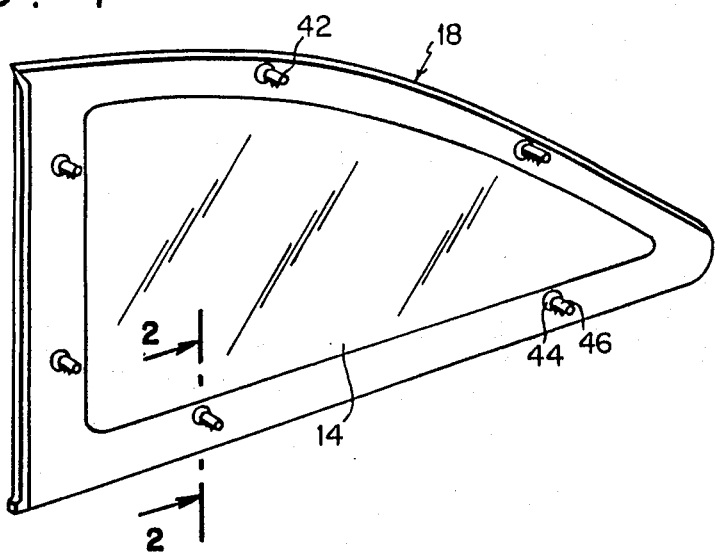
FIG. 1 is a perspective view of the interior side of the window assembly of the present invention.
Figure 2:
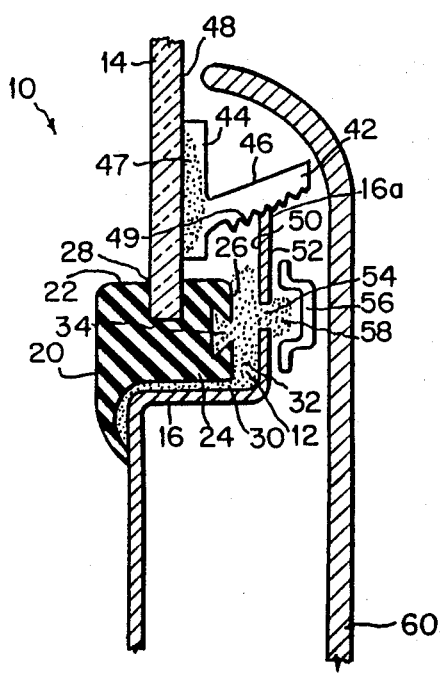
FIG. 2 is a side sectional view of the window assembly shown in FIG. 1 along the lines 2—2 prior to insertion onto the body panel.

Turning now in detail to the drawings, FIG. 1 is a perspective view of the interior side of the window assembly of the present invention. FIG. 2 is a side sectional view of the assembly shown in FIG. 1 along lines 2—2 prior to insertion into the body panel of the automotive vehicle.

Figure 3:
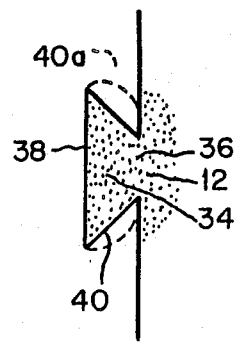
FIG. 3 is an enlarged view of the trapezoidal shaped recess in the moulding of the present invention.

Specifically FIG. 2 shows a retention system 10 for use with a curable adhesive 12 for retaining a glass window pane 14 supported on a flange 16 of an automobile vehicle body 18. The retention system comprises a moulding 20 having an inner surface 22, an outer surface 24, and a rear surface 26 connecting the inner surface to the outer surface. A glass window pane 14 is secured along its periphery 28 to the inner surface 22 of the moulding 20. A flange 16 is separated by a first spaced distance 30 from the outer surface 24 of the moulding 20, and is separated by a second spaced distance 32 from the rear surface 26 of the moulding 20. Means defining a shaped recess 34 (which is shown in greater detail in FIG. 3) is located within the rear surface 26 of the moulding 20. The recess 34 has an opening 36, shown in greater detail in FIG. 3, adjacent to the flange portion 16a, and the recess 34 has an end wall 38 located at a farther distance from the flange portion 16a than the opening 36 is located. The recess 34 has a side wall 40 connecting the opening 36 to the wall 38 to define an interior portion of the recess 34.

If the side wall 40 has flat walls, then the shaped recess 34 is trapezoidal or dove-tail shaped in the interior portion. If the side wall 40 has curved or circular wall 40a of FIG. 3, then the recess 34 is conical shaped in the interior portion. Preferably the recess is trapezoidal or dove-tail shaped.

The cross section of the opening 36 of the recess 34 is smaller than the cross-section of the interior portion of the recess. A curable adhesive 12 is received within the first spaced distance 30 between the outer surface 24 of the moulding 20 and the flange 16. The curable adhesive is also received within the second spaced distance 32 between the rear surface 26 of the moulding 20 and the flange portion 16a. The curable adhesive is additionally received within the trapezoidal or conical shaped recess interior 34; whereby a mechanical interlock is formed between the curable adhesive 12, upon the curing thereof, and the trapezoidal or conical shaped recess 34.

The retention system 10 preferably includes a plurality of retention elements 42, with each having a base portion 44 and having a generally perpendicular outwardly extending stem 46 attached to the base portion. The base portion 44 is fixedly secured by means of adhesive 47 to an inner peripheral surface 48 of the window pane 14. The stem 46 has a free end for lockingly engaging the flange at portion 16a, based upon stem gripping surface 49.

The retention system includes the flange portion 16a having an inner surface 50 and an outer surface 52. The system further includes a plurality of openings 54 in the flange connecting the inner surface 50 to the outer surface 52. Also there is a plurality of retaining means 56 attached to the outer surface 52 of the flange, with each of the retaining means having an interior portion 58 thereof in communication with each of the openings 54 in the flange and receiving the curable adhesive 12. The cross section of the interior portion 58 of each of the retaining means receiving the curable adhesive is greater than the cross section of the openings 54 in the flange; whereby a mechanical interlock is also formed between the curable adhesive, upon the curing thereof, and the outer surface 52 of the flange.

The retention element 42 is shown and described in greater detail in the Applicant's issued U.S. Pat. No. 4,841,698, and the disclosure of this issued patent is herewith incorporated by reference. The retaining means 56 is shown and described in greater detail in Applicant's issued U.S. Pat. No. 4,805,363, and the disclosure of this issued patent is herewith incorporated by reference.

FIG. 2 shows that there may also be present a headliner 60, generally made of fabric material, which is often utilized to form an aesthetically pleasing interior surface of the vehicle occupant compartment (not shown).

Figure 4:
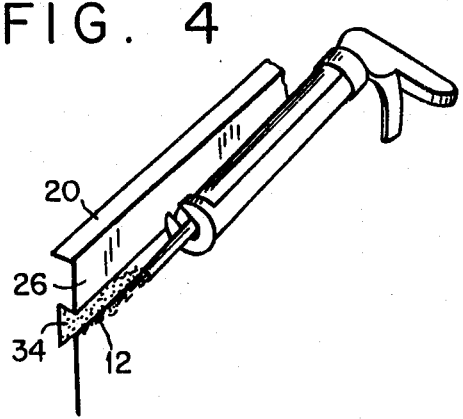
FIG. 4 is a perspective view of the trapezoidal shaped recess being filled with a curable adhesive along the length of the moulding.

FIG. 4 is a prespective view of the trapezoidal or dove-tail shaped interior poriton of recess 34 which is being filled with a curable adhesive 12 along the entire length of the moulding 20. From FIG. 4, it can be seen that the eventually produced mechanical interlock, which results from curing the curable adhesive, provides the present invention with the following advantages. Because this trapezoidal shaped recess runs the entire length of the moulding the mechanical interlock so produced is continuous and provides for a continuous seal along the rear surface of the moulding so as to prevent the seepage of water which may inadvertently get into the inside part of the window mounting section within the automobile door causing damage to many of the electrical and mechanical components stored within the door of the automobile. Because of the trapezoidal shape of the recess, which trapezoid is shown in greater detail in FIG. 3, it can be seen that if the adhesive should pull away from the rear surface 26 of the moulding, the water would be stoped from dripping down past the trapezoidal opening portion 36 because it would not be able to flow up and around past the interlock formed with the side walls 40 fo the trapezoid. This can be better understood when compared with the mechanical interlock formed by the retaining means 56 which are discretely attached to the flange adjacent to each respective opening 54 in the flange. The mechanical interlock formed by retaining means 56 is therefore not of the continous nature as is the mechanical interlock formed by the curable adhesive with the recess 34 in the rear surface of the moulding 20. Thus, the present invention provides this new and unexpected advantage that a continuous mechanical interlock can be formed with the curable adhesive.

Other modifications are possible, so that the shaped recess may have an irregular configuration, as long as the cross section of the opening 36 of the recess 34 is smaller than the cross section of the interior portions of the recess.

While only a single embodiment of the present invention has been shown and described, it is to be understood that many changes and modifications may be made thereunto without departing from the spirit and scope of the invention as defined in the appended claims.

What is claimed is:

1. A retention system for use with a curable adhesive for retaining a glass window pane supported on a flange of an automotive vehicle body, said retention system comprising:

a moulding having an inner surface, an outer surface and a rear surface connecting said inner surface to said outer surface:

a glass window pane secured along a periphery thereof to the inner surface of said moulding:

the flange separated by a first spaced distance from the outer surface of said moulding and separated by a second spaced distance from said rear surface of said moulding:

means defining a shaped recess within said rear surface of said moulding, said shaped recess having an opening adjacent to said flange, said recess having an end wall located at a farther distance from said flange than said opening is located, and said recess having a sidewall connecting said opening to said end wall to define and interior portion, a cross section of said opening of the recess being smaller than a cross section of the interior portion:

a curable ashesive received within said first spaced distance between the outer surface of said moulding and said flange and received within said second spaced distance between the rear surface of said moulding and said flange, and also received within said shaped recess, so as to form a mechanical interlock between the curable adhesive, upon the curing thereof, and the shaped recess:

wherein said flange has an inner surface and an outer surface, a plurality of openings in said flange connecting said flange inner surface to said flange outer surface; and a plurality of retaining means attached to said outer surface of said flange, each of said retaining means having an interior portion thereof in communication with each of said openings in said flange and receiving the curable adhesive, a cross section of said interior portion, of said retaining means, receiving the curable adhesive of each of said retaining means being greater than a cross section of said openings in said flange whereby a mechanical interlock is also formed between the curable adhesive, upon the curing thereof, and the outer surface of the said flange.

2. The retention system of claim 1, further comprising a plurality of retention elements each having a base portion and having a generally perpendicular outwardly extending stem attached to said base portion;
   said base portion fixedly secured to an inner peripheral surface of said window pane; and
   said stem having a free end with a stem gripping surface for lockingly engaging said flange.

3. The retention system of claim 1, wherein said shaped recess extends continuously the length of the moulding to produce a continuously mechanical interlock.

4. The retention system of claim 1, wherein said side wall has flat walls, such that said recess is trapezoidal shaped.

5. The retention system of claim 1, wherein said side wall has curved walls, such that said recess is conical shaped.

* * * * *